United States Patent Office 3,185,650
Patented May 25, 1965

3,185,650
PHOSPHOR-DIELECTRIC COMPOSITION
Edward Franklin Gurnee and Reet T. Fernandez, Midland, Mich., assignors to The Dow Chemical Company, Midland, Mich., a corporation of Delaware
No Drawing. Filed Jan. 23, 1962, Ser. No. 168,222
3 Claims. (Cl. 252—301.3)

The invention relates to an improved phosphor-dielectric mixture suitable for use in electroluminescent lamps.

The phenomenon of electroluminescence manifests itself by the glow of a selected compound, called a phosphor (usually ZnS activated by the presence of one or more elements which are usually selected from Mn, Cu and/or Se, together with Cl) substantially uniformly dispersed in a dielectric matrix, when placed in an oscillating electric field.

This phenomenon has been utilized to construct electroluminescent structures comprising a solidified intimate mixture of a dispersed phosphor in a dielectric matrix having an electrically conducting metal base adhered to one face thereof and a light-transmitting conducting film adhered to the other face, each of said base and film being provided with terminals for electrical connection to a source of oscillating current. When the terminals are connected to a source of oscillating electric current, they provide a subdued or low-level light unusually well adapted for use in darkened aisles, hallways, tunnels, subways, instrument boards, and the like.

The phosphor-dielectric layer, when adhered to an electrically conducting base, e.g., a metal, is generally referred to as a phosphor plate and when such plate is provided with a transparent electrically conducting film in contact with the opposite face of the phosphor-dielectric layer, it is generally referred to as an electroluminescent panel. Such panels for practical purposes require an adherent protective coating, principally for the purpose of preventing attack on the phosphor, when in use, by moisture in the air and often a second coating exterior thereto to screen out ultraviolet light incident thereon. It is necessary, of course, that at least that part of the protective film which is employed to protect the face of the transparent electrically conductive film be transparent. The protective films are usually employed as in the form of sealed envelopes which entirely ensheath the electroluminescent panels. The panels so protected and ready for installation in a circuit providing an oscillating electric field, e.g., one provided by a domestic source of A.C., is generally referred to as an electroluminescent lamp.

The dielectric material, for satisfactory performance, must meet rather narrow specifications. It must be fusible at temperatures which are not too high for use in the preparation of the intimate phosphor-dielectric mixture; it must be of a consistency which permits ready admixture with the phosphor particles; it must be chemically inert to the phosphor particles at the fusion temperature; it must solidify and remain a solid at the temperature at which it will be used; it must possess the requisite dielectric properties, i.e., provide relatively high electrical resistance but yet provide a sufficient break-down of the resistance to permit conductance of electricity to permit activation or excitation of the phosphor particles dispersed therein.

A number of materials have been found to be more-or-less satisfactory for use as the matrix in phosphor-dielectric mixtures for use in electroluminescent lamps, among which are: glass, ceramic material, and (to a limited extent) resinous plastic materials. The latter class of materials offers a number of advantages over glass or ceramic materials (commonly referred to as the frit), e.g., relative simplicity of manufacture, flexibility, and higher light intensity at a given voltage. A problem not entirely solved, however, which is associated with the use of resinous plastic materials as the dielectric, exists because the electrically conducting transparent film is usually laid down on the phosphor-dielectric layer while maintaining the layer at an elevated temperature. Some plastic materials, otherwise highly suitable for the purpose, do not withstand this elevated temperature satisfactorily and hence cannot be used.

In copending application S.N 168,221, filed concurrently herewith, there is described an improved type of transparent electrically conducting film comprising metallized resinous strands arranged in spaced-apart position in the form of a mat and pressed into the phosphor-dielectric layer of a phosphor plate composed of a phosphor dispersed in a resinous plastic dielectric matrix. The invention described in said copending application does not require the temperatures, for depositing or positioning the transparent electrically conducting film, to be sufficiently high to cause any undesirable effects on the dielectric matrix.

Resinous plastic materials, despite their improved performance over more rigid dielectric materials more commonly used, have not been found to provide as high an intensity of light for the voltage applied as is desirable. Furthermore, the method of constructing electroluminescent panels employing resinous dielectric materials have presented some problems in adhesion of the conducting plate and film thereto.

There, accordingly, is a need in the art of making electroluminescent lamps to provide a dielectric-phosphor plate which emits light of greater intensity at a given voltage, to facilitate the making of the lamps, and to insure better adhesion of electrically conducting plates and films to the phosphor-resinous dielectric layer.

The present invention is predicated on the unexpected discovery that when a polyvinyl chloride plastisol, wherein the plasticizer or liquid medium is selected on the basic of its critical specific resistivity, is employed as the dielectric material in intimate admixture with a phosphor, superior adhesion of conducting plates and higher light intensity for a given voltage results. The term plastisol, as used herein, refers to polyvinyl chloride dispersed in an organic liquid medium which, upon heating, infuses into the polyvinyl chloride to make a resinous solid.

The invention meets the foregoing and related needs by providing a dielectric-phosphor mixture suitable for use in electroluminescent lamps which employs a matrix of satisfactory dielectric strength but which has a relatively higher electric conductivity than heretofore possessed by dielectric materials considered suitable for this purpose and by providing an improved way of obtaining excellent bonding of the electrically conductive plate or film to the phosphor-dielectric layer. As a result of the higher conductivity of this material, a larger proportion of the applied voltage is transmitted through the dielectric matrix to the phosphor particles whereby they are excited or activated to a greater extent resulting in more intensive light emission.

The invention contemplates an improved phosphor plate prepared by dispersing a particulate phosphor in a polyvinyl chloride plastisol wherein the plasticizer medium of the plastisol is an organic liquid having a critical specific resistivity of more than $10^7$ and less than $10^{10}$, and preferably between $10^7$ and $10^9$, inclusive, ohm-centimeters. It further contemplates electroluminescent panels and lamps made employing such phosphor plate. It also contemplates an improved method of making electroluminescent panels and lamps.

The invention is preferably carried out by admixing a phosphor material, e.g., ZnS activated by Cu and Cl, with a polyvinyl chloride plastisol, the plasticizer or liquid medium of the plastisol used in the practice of the invention being as above named; spreading or otherwise positioning a layer thereof on a suitable electrically conducting base; and placing on the thus spread layer of phosphor-plastisol a suitable transparent electrically conducting film to make a panel. Appropriate electrical terminals are provided in the electrically conducting base and transparent film. The thus assembled panel is then heated whereby the plastisol is converted to a solid. Exterior transparent protective films, e.g., those resistant to moisture and to ultraviolet light may be provided by known techniques.

Among the preferred plasticizers to employ to prepare the plastisol for use in the practice of the invention are:

(1) Cresyl diphenyl phosphate
(2) Tri(2-ethylhexyl)phosphate
(3) Ortho-tricresyl phosphate
(4) Meta-tricresyl phosphate
(5) 2-biphenyl diphenyl phosphate
(6) Diethylene glycol dibenzoate
(7) Dimethyl phthalate
(8) Diethyl phthalate
(9) Dibutyl phthalate and
(10) Butyl cyclohexyl phthalate All of the above plasticizers have critical specific resistivities of from about $10^7$ to about $10^9$ ohm-centimeters, inclusive.

The plastisol employed usually consists of a 15% to 60% by weight dispersion, and preferably a 25% to 50% dispersion, of polyvinyl chloride in the selected plasticizer. When the percent of polyvinyl chloride is less than about 15%, the plastisol does not solidify on heating. Too high a percent of polyvinyl chloride results in too viscous a material.

The weight proportion of the phosphor material dispersed in the plastisol may be between about 10% and 90% by weight of the phosphor and the balance plastisol, but a weight proportion of between about 40% and 80% is recommended. When only about 10% or less phosphor is employed, the space between phosphor particles is too great and, as a result, the light emitted therefrom becomes faint. When 90% or more phosphor is employed, the distance between phosphor particles is too small to provide adequate dielectric material therebetween.

After the phosphor-dielectric mixture of the invention has been prepared, it may be employed in the manufacture of phosphor plates and thence in the manufacture of electroluminescent panels and electroluminescent lamps in accordance with known procedures and techniques. The plastisol, having the phosphor substantially uniformly dispersed therein, is deposited or spread at the desired thickness, e.g., between about 0.5 and 25 mils, usually between about 1 and 5 mils, on an electrically conducting base plate or foil sheet and an electrically conducting transparent film, e.g., an oxide of tin or indium or preferably the metallized resinous strands arranged in a mat as taught by the above-identified application filed concurrently herewith, deposited on, and adhered to, the top of the phosphor-plastisol mixture. To insure the desired thickness of phosphor-dielectric layer, spacers are usually inserted between the two electrically conducting plates or films, and platens, to exert light or contacting pressure, placed firmly, substantially parallel to each other, on the outside of the plates or films. The assembly is then subjected to an elevated temperature, usually between about 100° C. and 190° C. for between about 5 and 20 minutes. The higher the temperature employed, the less time is required. A temperature of between about 140° and 160° C. for about 10 minutes is recommended. During the heating period, the plasticizer medium of the dielectric mixture infuses into the polyvinyl chloride, and there results a solid phosphor-dielectric layer in firm contact with the electrically conducting base plate on one side and the electrically conducting transparent plate or film on the other side. For the purpose of protecting the electroluminescent panel thus made, a protective envelope of transparent plastic is provided about the panel. This may be conveniently applied prior to the above heating period or it may be applied subsequently, if preferred. Among the preferred resinous plastic materials used for such protective envelope is the graft copolymer comprising acrylic or methacrylic acid grafted onto a polyolefin polymer as described in copending application S.N. 161,485, filed December 22, 1961.

The following example is illustrative of the practice of the invention.

25 parts of polyvinyl chloride were admixed with 75 parts by weight of dimethyl phthalate to make 100 parts of plastisol. There were then admixed, and substantially uniformly dispersed therein 60 parts of particulate ZnS containing Cu and Cl activators per 40 parts of the plastisol. The phosphor-dielectric mixture thus made was placed as a relatively thin layer between two electrically conducting transparent plates ($SnO_2$-coated glass plates), provided with electrical terminals embedded therein, the plates held in position by spacers and platens at contacting pressure, the assembly heated for 10 minutes at 150° C. and then cooled. The resulting panel is illustrative of an article of manufacture of the invention.

Before the panel is put into use, it is preferably encapsulated or otherwise provided with a transparent moisture-protective sealing film and usually also with an additional transparent film exterior thereto to screen out ultraviolet light incident thereto. The lamp so made has long light-emitting life due to the excellent adhesion afforded by the plastisol during solidification and provides a more intense light at a given voltage, representing a substantial saving in operation.

Further examples of the invention were run as follows:
ZnS (activated by Cu and Cl) phosphor-plastisol mixtures were prepared employing each of the 10 plasticizers listed hereinbefore. The plastisol consisted by weight of 30 percent polyvinyl chloride and 70% plasticizer. The phosphor to plastisol weight proportion was about 50:50. Mixtures thereof were spread at a thickness of about 2 mils between electrically conducting plates, each provided with an electrical terminal and the panel so made cured to provide panels according to the invention. Each panel was then connected to an A.C., 60 cycle, electrical source. Panels were also made employing known phosphor-dielectric compositions. The panels were tested by means of a photo-multiplier tube which converted the light emitted therefrom to volts which were in turn read on an oscilloscope. The intensity of light emitted by the panels of the invention at a given voltage was higher than that emitted by the known phosphor-dielectric compositions tested. The intensity of the electroluminescent panels employing a plastisol containing a plasticizer in accordance with the practice of the invention decreased in the order of 1 to 10 as numerically set out hereinbefore, and all were superior to heretofore known phosphor-dielectric compositions which were tested.

The relative brightness of the ten phosphor-dielectric compositions, employing the plastisol comprising each of the ten plasticizers, was as follows:

| Plasticizer: | Brightness as measured in millivolts on oscilloscope |
|---|---|
| (1) Cresyl diphenyl phosphate | 4,044 |
| (2) Tri(2-ethylhexyl)phosphate | 2,100 |
| (3) Ortho-tricresyl phosphate | 1,100 |
| (4) Meta-tricresyl phosphate | 1,086 |
| (5) 2-biphenyl diphenyl phosphate | 966 |
| (6) Diethylene glycol dibenzoate | 787 |
| (7) Dimethyl phthalate | 677 |
| (8) Diethyl phthalate | 537 |
| (9) Dibutyl phthalate | 388 |
| (10) Butyl cyclohexyl phthalate | 316 |

For comparative purposes, other plastic dielectric materials were employed to prepare electroluminescent panels and tested. Included were plastisols employing, as organic plasticizers: decyl butyl phthalate, dioctyl phthalate, and dicapryl phthalate, each of which has a critical specific resistivity on the order of $10^{11}$. When the panels were tested the values obtained were 181, 159, and 136 millivolts respectively. A light brightness corresponding to a reading of less than about 200 millivolts is unacceptable.

When the performance of the phosphor-dielectric compositions are evaluated in terms of critical specific resistivity, and brightness of electroluminescent panels made therefrom, the following conclusions may be drawn: When the plasticizer employed in the preparation of the plastisol used in the phosphor-dielectric layer of an electroluminescent panel has critical specific resistivity of less than about $10^7$ or greater than about $10^{10}$, the intensity of the light emitted by an electroluminescent panel made therefrom is unacceptable. When the plasticizer employed has a critical specific resistivity of between about $10^8$ and $10^9$, the light emitted by an electroluminescent panel employing it is particularly satisfactory.

Having described the invention, what we claim and desire to protect by Letters Patent is:

1. A phosphor-dielectric layer consisting essentially of between about 10% and about 90% by weight of a particulated electroluminescent phosphor material selected from the class consisting of copper-activated and chlorine-activated zinc sulfide substantially uniformly dispersed in a plastisol to make a total of 100% of said mixture, said plastisol consisting of between about 15% and about 60% polyvinyl chloride dispersed in sufficient organic plasticizer to make a total of 100% plastisol, said plasticizer having a critical specific resistivity of greater than $10^7$ and less than $10^{10}$ ohm-centimeters and selected from the class consisting of cresyl diphenyl phosphate, tri(2-ethylhexyl) phosphate, ortho-tricresyl phosphate, metatricresyl phosphate, 2-biphenyl diphenyl phosphate, diethylene glycol bidenzoate, dimethyl phthalate, diethyl phthalate, dibutyl phthalate, and butyl cyclohexyl phthalate.

2. The phosphor-dielectric layer of claim 1 wherein the plastisol is a 20 to 40% by weight dispersion of polyvinyl chloride in said organic plasticizer.

3. The phosphor-dielectric layer of claim 1 wherein the plasticizer is dimethyl phthalate.

References Cited by the Examiner
UNITED STATES PATENTS

| | | | |
|---|---|---|---|
| 2,171,334 | 8/39 | Fuoss | 252—63.2 |
| 2,231,595 | 2/41 | Safford | 252—63.2 |
| 3,030,542 | 4/62 | Knochel et al. | 313—108 |
| 3,037,138 | 5/62 | Motson | 177—33.5 X |
| 3,043,710 | 7/62 | Patten et al. | 117—33.5 |

OTHER REFERENCES

Roberts: "Field Strength and Temperature Studies of Electro-Luminescent Powders in Dielectric Media," Journal of the Optical Society of America, vol. 42, No. 11, November 1952. Pages 850–854.

Schildknecht: "Vinyl and Related Polymers," John Wiley, New York, 1952. Pages 418, 419, and 425–437.

GEORGE N. WESTBY, *Primary Examiner.*

ARTHUR GAUSS, *Examiner.*